United States Patent
Matsuda et al.

(10) Patent No.: US 7,403,847 B2
(45) Date of Patent: Jul. 22, 2008

(54) ENGINE CONTROL DEVICE AND ENGINE CONTROL METHOD FOR STRADDLE TYPE VEHICLE

(75) Inventors: Takeshi Matsuda, Shizuoka (JP); Hidenori Akatsuka, Shizuoka (JP); Daichi Noborio, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 11/408,592

(22) Filed: Apr. 20, 2006

(65) Prior Publication Data

US 2006/0287796 A1    Dec. 21, 2006

(30) Foreign Application Priority Data

May 2, 2005  (JP)  ............................. 2005-133783
Apr. 6, 2006  (JP)  ............................. 2006-105062

(51) Int. Cl.
*G06F 7/00*    (2006.01)
*G06F 17/00*    (2006.01)
*G06F 19/00*    (2006.01)

(52) U.S. Cl. ........................ 701/54; 701/85; 180/335; 60/906

(58) Field of Classification Search .................. 701/54, 701/85; 180/335; 267/123; 60/906; 91/246, 91/26, 274, 335, 396, 399, 12; 123/336, 123/337, 376, 398, 406.52, 462, 683, 586
See application file for complete search history.

(56) References Cited

U.S. PATENT DOCUMENTS

| | | | | |
|---|---|---|---|---|
| 4,773,372 A | * | 9/1988 | Stumm et al. ................ | 123/399 |
| 4,879,657 A | * | 11/1989 | Tamura et al. ............... | 701/110 |
| 4,967,610 A | * | 11/1990 | Sasajima et al. ............. | 477/68 |
| 4,971,164 A | * | 11/1990 | Fujita et al. ................. | 180/197 |
| 5,048,485 A | * | 9/1991 | Terazawa et al. ............ | 123/399 |
| 5,159,990 A | * | 11/1992 | Abe et al. ................... | 180/197 |
| 5,282,137 A | * | 1/1994 | Suzuki et al. ............... | 701/185 |
| 5,325,832 A | * | 7/1994 | Maute et al. ................ | 123/396 |
| 5,393,278 A | * | 2/1995 | Kyushima et al. ........... | 477/120 |
| 5,406,483 A | * | 4/1995 | Kallis et al. ................. | 701/53 |
| 5,445,121 A | * | 8/1995 | Kai ........................ | 123/198 DC |

(Continued)

FOREIGN PATENT DOCUMENTS

DE    4214179 C1    5/1993

(Continued)

OTHER PUBLICATIONS

European Search Report for corresponding European application 06009077.6 lists the references above.

*Primary Examiner*—Khoi H. Tran
*Assistant Examiner*—Jorge O Peche
(74) *Attorney, Agent, or Firm*—Hogan & Hartson LLP

(57) ABSTRACT

An engine control device capable of decreasing engine output while giving less uncomfortable feeling to the rider in the event of a failure, with a simple configuration. Engine output is decreased when a failure has been detected in a throttle valve. When engine speed after the occurrence of the failure is larger than preset target rotational speed at the time of the occurrence of the failure, an ignition of the engine is cut off. The engine speed thereby can be decreased according to the preset target rotational speed. Thus, engine output can be decreased uniquely.

10 Claims, 6 Drawing Sheets

U.S. PATENT DOCUMENTS

| | | | | |
|---|---|---|---|---|
| 5,526,261 A * | 6/1996 | Kallis et al. | | 701/51 |
| 5,625,558 A * | 4/1997 | Togai et al. | | 701/93 |
| 5,629,852 A * | 5/1997 | Yokoyama et al. | | 701/101 |
| 5,665,026 A * | 9/1997 | Linden | | 477/108 |
| 5,718,202 A * | 2/1998 | Bentz et al. | | 123/399 |
| 5,889,204 A * | 3/1999 | Scherer et al. | | 73/118.2 |
| 6,390,949 B1 * | 5/2002 | Kondo et al. | | 477/143 |
| 6,491,022 B2 * | 12/2002 | Okamoto | | 123/396 |
| 6,505,594 B1 * | 1/2003 | Katayama et al. | | 123/179.18 |
| 6,550,449 B2 * | 4/2003 | Akazaki et al. | | 123/339.11 |
| 6,647,959 B2 * | 11/2003 | Noguchi | | 123/396 |
| 6,751,544 B2 * | 6/2004 | Hashimoto et al. | | 701/107 |
| 6,766,785 B2 * | 7/2004 | Ishida et al. | | 123/399 |
| 6,779,508 B2 * | 8/2004 | Fuwa | | 123/396 |
| 6,874,468 B2 * | 4/2005 | Watanabe | | 123/377 |
| 6,964,260 B2 * | 11/2005 | Samoto et al. | | 123/406.13 |
| 2001/0047792 A1 * | 12/2001 | Akazaki et al. | | 123/339.11 |
| 2002/0066435 A1 * | 6/2002 | Okamoto | | 123/396 |
| 2003/0062025 A1 * | 4/2003 | Samoto et al. | | 123/396 |
| 2003/0084873 A1 * | 5/2003 | Ishida et al. | | 123/399 |
| 2003/0183194 A1 * | 10/2003 | Noguchi | | 123/396 |
| 2004/0002808 A1 * | 1/2004 | Hashimoto et al. | | 701/107 |
| 2004/0035391 A1 * | 2/2004 | Fuwa | | 123/396 |
| 2004/0245034 A1 * | 12/2004 | Miyamoto et al. | | 180/170 |
| 2006/0040791 A1 * | 2/2006 | Nakajima et al. | | 477/111 |
| 2006/0081215 A1 * | 4/2006 | Kinoshita | | 123/339.11 |
| 2006/0213483 A1 * | 9/2006 | Miyachi | | 123/399 |
| 2007/0169743 A1 * | 7/2007 | Kobayashi et al. | | 123/352 |

FOREIGN PATENT DOCUMENTS

| | | |
|---|---|---|
| EP | 1288468 A2 | 3/2003 |
| JP | 06-248979 | 9/1994 |
| JP | 2003-065140 | 3/2003 |

* cited by examiner

ENGINE CONTROL DEVICE AND ENGINE CONTROL METHOD FOR STRADDLE TYPE VEHICLE

BACKGROUND OF THE INVENTION

1. Field of the Invention

The present invention relates to an engine control device and an engine control method for a straddle type vehicle, and more specifically to an engine control device and an engine control method having engine output decreasing means for decreasing engine output when a failure is detected in a throttle valve control system.

2. Description of Related Art

An electronic throttle valve system for electronically controlling the opening of a throttle valve can control the amount of intake air to an engine accurately. Thus, the electronic throttle valve system can reduce emission and fuel consumption and has been used in some four-wheeled motor vehicles.

Such an electronic throttle valve system is equipped with a function that stops the actuation of the throttle valve by an electric motor and returns the throttle valve in the closing direction by the urging force of a spring when a throttle valve control system has a failure.

The speed at which the throttle valve is rotated in the closing direction by the urging force of the spring is very high. Thus, the output of the engine is rapidly decreased. In the case of a four-wheeled passenger vehicle, a driver does not feel a change in the behavior of the vehicle even when the engine output is rapidly decreased since the vehicle is heavy. In the case of a two-wheeled motor vehicle which is light, however, a rapid decrease in the engine output gives the rider an uncomfortable feeling.

Japanese Patent Document JP-A-Hei 6-248979 discloses a method of closing a throttle valve gently by applying a resistance to the rotation of the throttle valve, which is urged in the closing direction by a spring, to prevent rapid rotation of the throttle valve. A rapid decrease in the engine output can be thus avoided and the vehicle does not make jerky movements even when running in low gear.

Japanese Patent Document JP-A-2003-65140 discloses a method of decreasing engine output gradually by controlling ignition to the engine, as well as by controlling the throttle valve as in JP-A-Hei 6-248979. More specifically, retarding ignition timing, decreasing the frequency of ignition, or cutting off ignition is conducted to decrease engine output smoothly.

It is certain that closing the throttle valve gently can avoid a rapid decrease in the engine output. However, there might be a range of the opening of the throttle valve in which the engine output does not decrease. In this case, since the engine output is constant, the rider might feel an acceleration feeling.

Meanwhile, in the case of controlling ignition to the engine to control the engine output, more responsive control of the engine output is enabled compared to the case in which the rotation of the throttle valve is controlled, so that the engine output is decreased invariably. The rider thus does not feel any acceleration feeling as described above.

However, retarding ignition timing, decreasing the frequency of ignition, or cutting off ignition is conducted under preset conditions. Thus, the way the engine output decreases varies depending on the vehicle's operating conditions including engine speed in the event of a failure, and is not uniquely defined. As a result, the engine output decreases but the rider might get an uncomfortable feeling.

SUMMARY OF THE INVENTION

The present invention has been made in view of the foregoing problems. A main object of the present invention is to provide an engine control device capable of decreasing engine output while giving the rider a less uncomfortable feeling when a throttle valve control system has a failure.

The present invention is directed to an engine control device for a straddle type vehicle, having engine output decreasing means for decreasing engine output when a failure has been detected in a throttle valve control system. The engine output decreasing means comprises target rotational speed setting means for setting engine speed after the occurrence of the failure to target rotational speed required to decrease engine output and rotational speed detection means for detecting the engine speed after the occurrence of the failure. When the engine speed detected by the rotational speed detection means is larger than the target rotational speed, an ignition of the engine is cut off.

In a preferred embodiment, the target rotational speed is set to decrease stepwise at regular time intervals based on the engine speed at the time of the occurrence of the failure.

In a preferred embodiment, the target rotational speed has preset minimum target rotational speed, which is a lower limit value of the target rotational speed range.

The minimum target rotational speed is preferably set at least to a value larger than the engine speed at idle.

In a preferred embodiment, when the engine speed detected by the rotational speed detection means is larger than the target rotational speed, fuel injection to the engine is stopped.

In a preferred embodiment, a throttle valve is designed to be rotatively actuated in the closing direction when the failure has been detected in the throttle valve control system.

The present invention is directed to an engine control method for a straddle type vehicle, having engine output decreasing means for decreasing engine output when a failure is detected in a throttle valve control system. The engine output decreasing means has an output decreasing mode in which engine output is decreased when a failure has been detected in a throttle valve control system. In the output decreasing mode, when engine speed after the occurrence of the failure is larger than preset target rotational speed at the time of the occurrence of the failure, an ignition of the engine is cut off.

In a preferred embodiment, in the output decreasing mode, when the engine speed after the occurrence of the failure is larger than the preset target rotational speed at the time of the occurrence of the failure, fuel injection to the engine is stopped.

In a preferred embodiment, the target rotational speed is set to decrease stepwise at regular time intervals based on the engine speed at the time of the occurrence of the failure.

A straddle type vehicle according to the present invention is a straddle type vehicle with the above engine control device.

In an engine control device for a straddle type vehicle of the present invention, in the case in which a failure has been detected in a throttle valve control system, when engine speed after the occurrence of the failure is larger than preset target rotational speed at the time of the occurrence of the failure, an ignition of the engine is cut off. The engine speed thereby can be decreased according to the preset target rotational speed. Thus, engine output can be decreased uniquely.

DETAILED DESCRIPTION OF THE INVENTION

Figure 1:
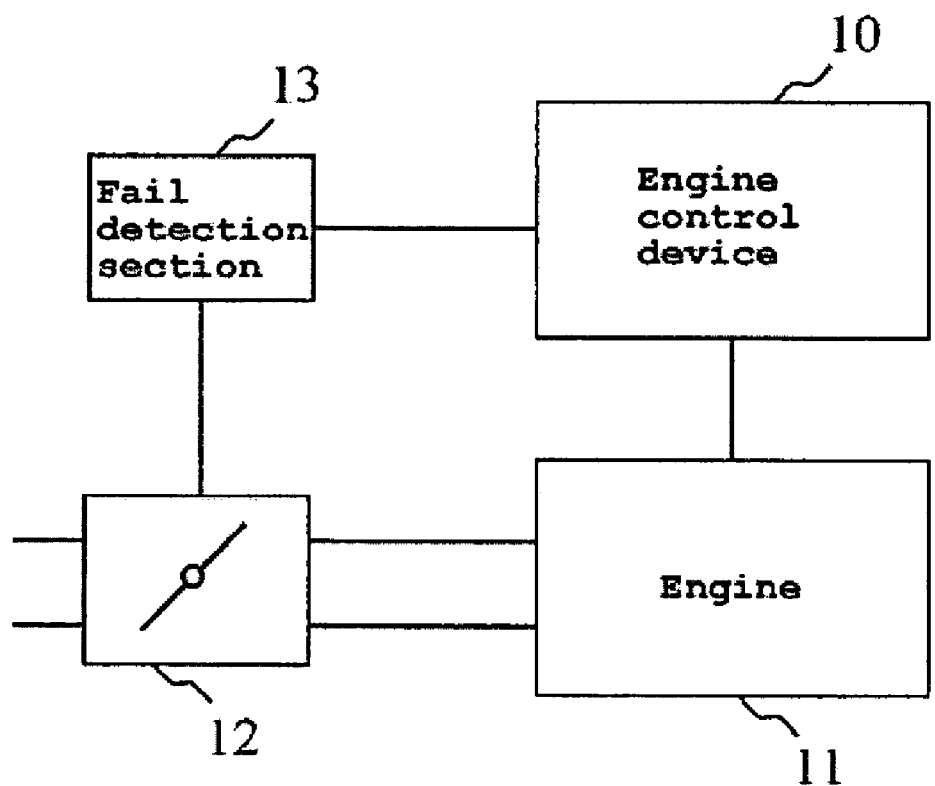
FIG. 1 illustrates the basic configuration of an engine control device for a two-wheeled motor vehicle having an electronic throttle valve.

An embodiment of the present invention is described below with reference to the drawings. In the drawings below, for the sake of simplifying explanation, components having substantially the same function are indicated with the same reference symbol. Further, the present invention is not limited to the following embodiment.

FIG. 1 illustrates the basic configuration of an engine control device for a two-wheeled motor vehicle having an electronic throttle valve. An engine control device 10 electronically controls a throttle valve 12 to adjust the amount of intake air to an engine 11, and a fuel injection device (not shown) to inject fuel to the engine 11. A fail detection section 13 is disposed near the throttle valve 12. When a throttle valve control system has a failure, a fail signal is transmitted from the fail detection section 13 to the engine control device so that the control device is enabled accordingly.

The failure of the throttle valve 12 (hereinafter referred to as including the throttle valve control system) is detected by various criteria for determination. For example, an error between a target opening of the throttle valve 12 and an actual throttle opening is detected, and when the error detected is beyond the allowable limits and such state continues for a predetermined time, the failure is determined. The present invention imposes no special limitations on the criteria for determination of a failure.

Figure 2:
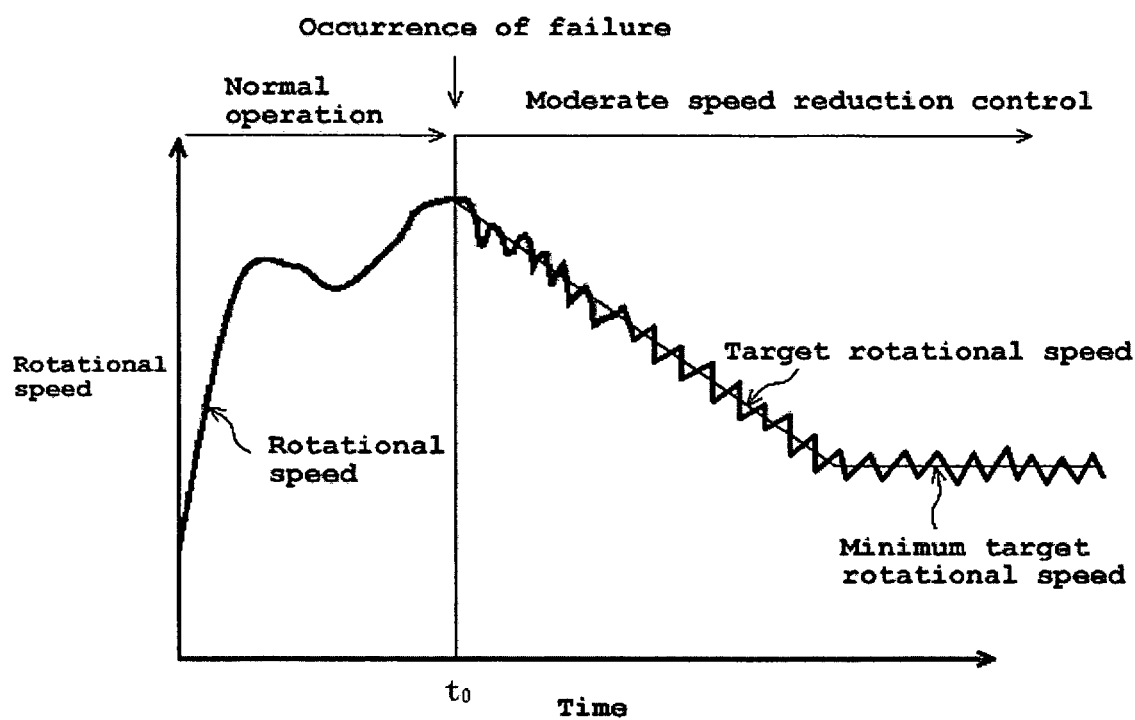
FIG. 2 is a schematic graph illustrating a control method for decreasing engine output in the event of a failure according to the present invention.

FIG. 2 is a schematic graph illustrating a control method for decreasing engine output in the event of a failure according to the present invention. The vertical axis represents engine speed, and the horizontal axis represents time.

In the case in which a failure of the throttle valve 12 has been detected by the fail detection section 13 at time t0, the control mode of the engine 11 is switched from normal control mode to failure control mode in which the engine output is decreased (moderate speed reduction control mode). At this time, target rotational speed (see a graph shown by a thin solid line) is set that is required for the engine speed after the occurrence of the failure to decrease the engine output. The target rotational speed is set together with minimum target rotational speed, which is a lower limit value of the target rotational speed range.

After the occurrence of the failure, the engine speed (see a graph shown by a thick solid line) is detected, and when the detected speed is larger than the preset target rotational speed, ignition to the engine is cut off. Cutting off the ignition causes the engine speed to decrease. However, when the engine speed is detected at the next timing and the detected speed is smaller than the preset target rotational speed, the ignition to the engine is performed normally, so that the engine speed increases temporarily. When the engine speed is detected at the next timing and the detected speed is larger than the preset target rotational speed, the ignition is again cut off. The engine speed thereby decreases again.

Repetitively cutting off the ignition in such manner can cause the engine speed to decrease according to the target rotational speed while the engine speed increases and decreases at very short time intervals relative to the target rotational speed. When the engine speed is decreased to the minimum target rotational speed, the engine speed is kept at the minimum target rotational speed.

In the case in which the minimum target rotational speed is set at least to a value larger than the engine speed at idle, even when the engine output is decreased after the occurrence of the failure, the operable state of the vehicle can be maintained.

Means for decreasing the engine output according to the present invention is similar to a method of decreasing the frequency of ignition. Whether or not the ignition should be cut off is determined based on the preset target rotational speed, thereby uniquely defining a decrease in the engine output.

Further, in the present invention, when the detected rotational speed is larger than the preset target rotational speed, fuel injection may be stopped, as well as ignition being cut off. In this case, emission can be reduced compared to the case in which only the ignition cutoff is performed.

Figure 3:
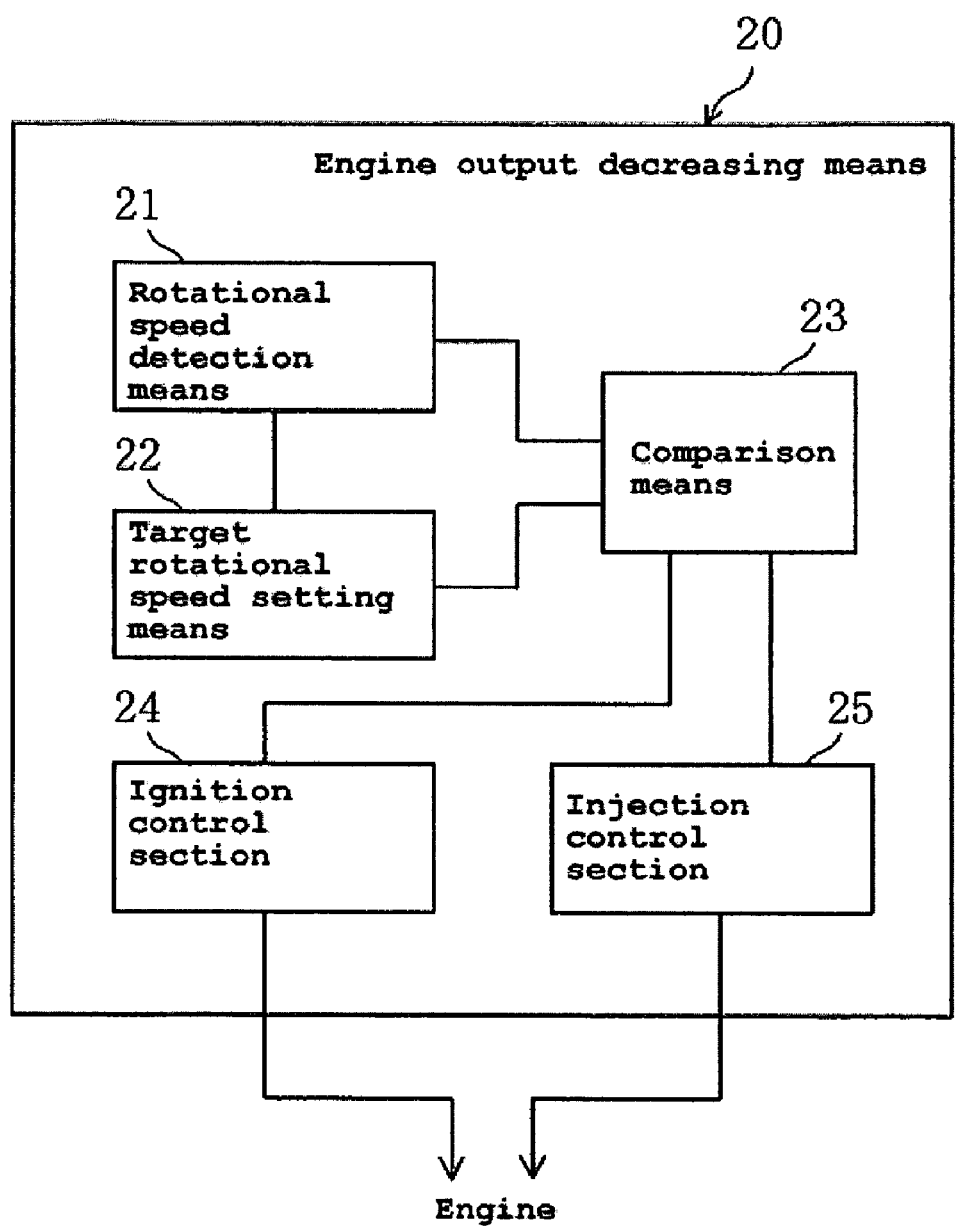
FIG. 3 illustrates the configuration of engine output decreasing means for decreasing engine output in the event of a failure according to the present invention.

FIG. 3 illustrates the configuration of engine output decreasing means 20 for decreasing engine output in the event of a failure according to the present invention.

The engine output decreasing means 20 includes rotational speed detection means 21 for detecting engine speed after the occurrence of a failure; target rotational speed setting means 22 for setting the engine speed after the occurrence of the failure to target rotational speed required to decrease engine output; and comparison means 23 for comparing values of the engine speed and the target rotational speed.

When the comparison means 23 determines that the engine speed detected by the rotational speed detection means 21 is larger than the target rotational speed set by the target rotational speed setting means 22, an ignition cutoff signal is transmitted to an ignition control section 24 so that ignition to the engine is cut off. Also, an injection stop signal is transmitted to an injection control section 25 so that fuel injection is stopped.

In the above configuration, the rotational speed detection means 21, the ignition control section 24, and the injection control section 25 may be used also in the normal operation.

Figure 4:
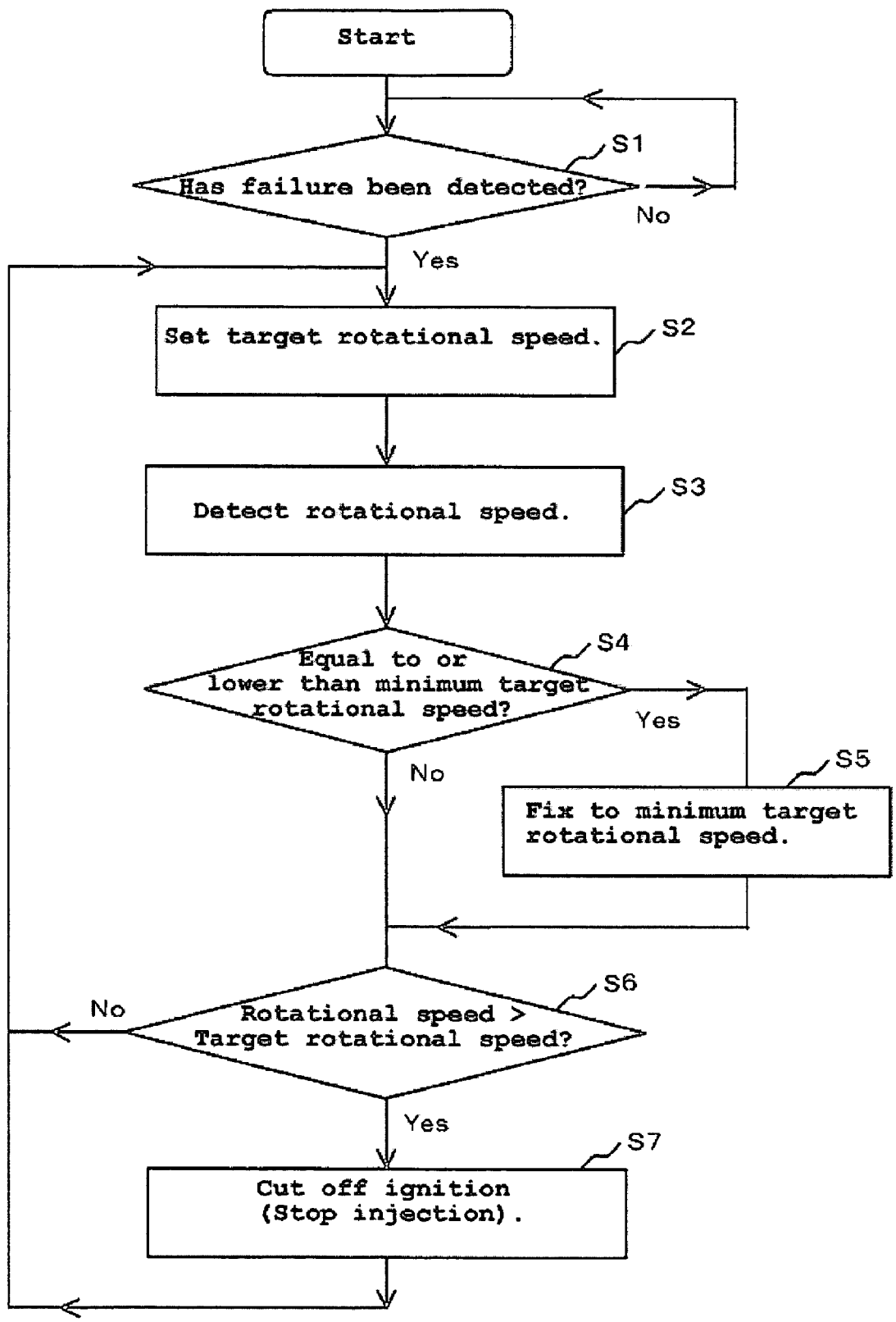
FIG. 4 is a flowchart illustrating an engine control method of the present invention.

Next, an engine control method of the present invention will be described with reference to a flowchart of FIG. 4.

The fail detection section 13 detects whether or not a failure has occurred in the throttle valve 12 (step S1). When the failure has been detected, the target rotational speed setting means 22 sets target rotational speed (step S2). As described above, the target rotational speed is set to a value required for the engine speed after the occurrence of the failure to decrease engine output. At the same time, the rotational speed detection means 21 detects engine speed (step S3).

Then, it is determined whether or not the detected engine speed is equal to or lower than minimum target rotational speed (step S4). When the detected engine speed is not equal to or lower than the minimum target rotational speed, the comparison means 23 compares the target rotational speed set in the step S2 with the engine speed detected in the step S3 (step S6).

In the step S6, when the detected rotational speed is larger than the target rotational speed, ignition to the engine is cut off (or fuel injection is stopped, as well as ignition being cut off) (step S7). Meanwhile, when the detected rotational speed is smaller than the target rotational speed, the process returns to the step S2 and repeats the step S2 through the step S7. When the detected rotational speed is smaller than the target rotational speed, the ignition is performed normally.

In such manner, as the ignition is controlled by determining whether or not the ignition should be cut off based on the preset target rotational speed in the step S6, the engine speed after the occurrence of the failure can be decreased according to the target rotational speed. When the engine speed is decreased to the minimum target rotational speed in the step S4, the target rotational speed is fixed to the minimum target rotational speed (step S5), and thereafter, the engine speed is kept at the minimum target rotational speed.

The target rotational speed is basically set to a value at which engine output is decreased while giving the rider a less uncomfortable feeling. An example of such setting is described below with reference to FIG. 5.

When a failure occurs at time $t_0$, engine speed $N_0$ at this time is set as an initial value of target rotational speed. The target rotational speed is set to decrease stepwise by rotational speed $\Delta N$ based on the engine speed $N_0$ as time $\Delta T$ elapses. In other words, target rotational speed $N_i$ at time $t_i$ is set by the following equation:

$$N_i(t_i)=N_0-[(t_i-t_0)/\Delta T \times \Delta N] \quad (t_i=m \times \Delta T, \text{wherein m is an interger}) \quad (1)$$

Figure 5:
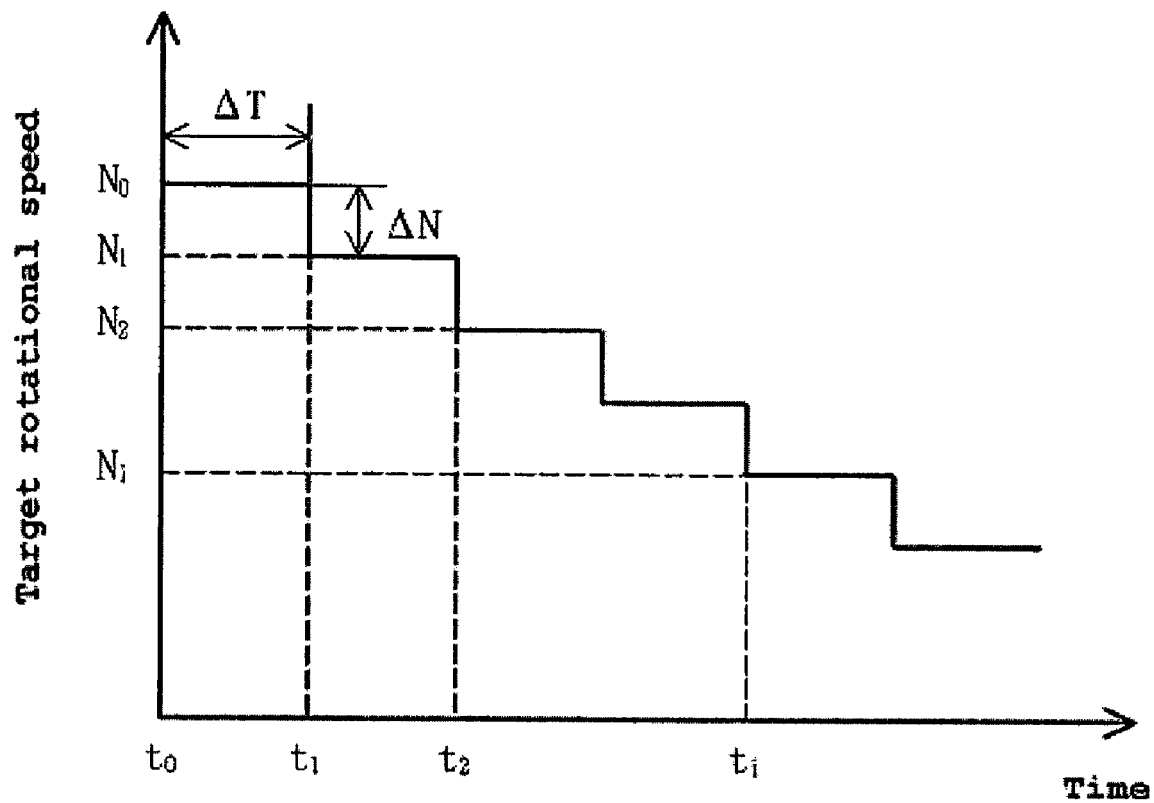
FIG. 5 is a graph illustrating an example of setting of target rotational speed according to the present invention.

Although not shown in FIG. 5, when the target rotational speed $N_i$ decreases stepwise to minimum target rotational speed $N_{min}$, $N_i$ is set to a certain value of $N_{min}$ and kept at it thereafter, as shown in FIG. 2.

According to this method, by storing only the values of $\Delta T$, $\Delta N$ and $N_{min}$ in the target rotational speed setting means 22, the target rotational speed can be easily set using the equation (1) as well as the engine speed $N_0$ detected in the event of a failure.

The values of $\Delta T$ and $\Delta N$ are constant, but the values of $\Delta T$ and/or $\Delta N$ may be gradually increased with a lapse of time after the occurrence of a failure. Alternatively, the target rotational speed suitable for a vehicle to which the present invention is applied may be obtained by actual measurement and stored in the storage means.

The time $\Delta T$ can be set arbitrarily. However, the time $\Delta T$ may be set at the timing at which the step S5 of comparing the rotational speed and the target rotational speed shown in FIG. 4 is executed. The timing at which the step S5 is executed can be set arbitrarily, but typically the step S5 is executed every 5 through 10 ms.

Figure 6:
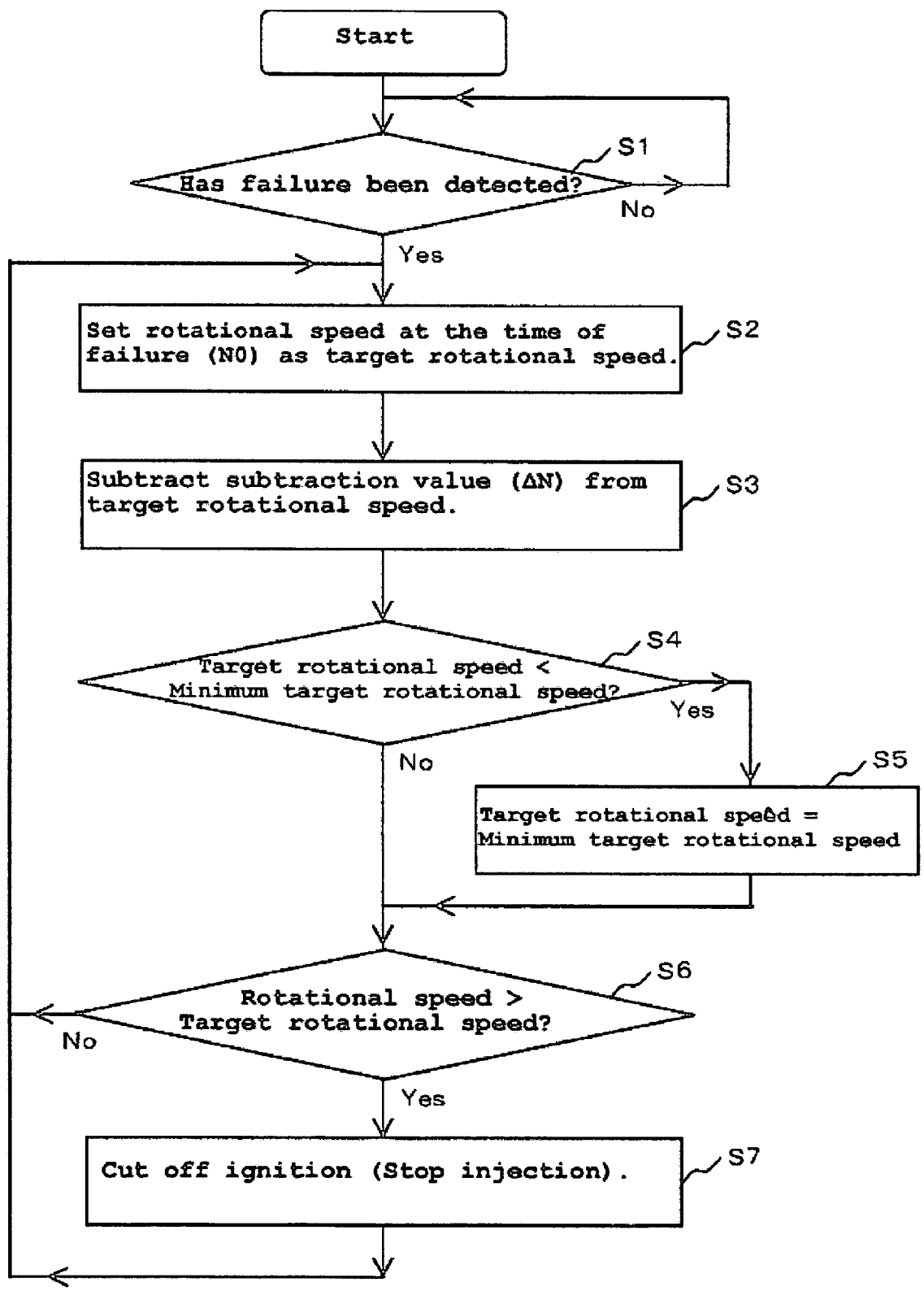
FIG. 6 is a flowchart illustrating an engine control method of the present invention.

A flowchart of an engine control method using the method of setting target rotational speed shown in FIG. 5 is shown in FIG. 6.

The fail detection section 13 detects whether or not a failure has occurred in the throttle valve 12 (step S1). When the failure has been detected, engine speed ($N_0$) at the time of the occurrence of the failure is set as target rotational speed ($N_i$) (step S2). After a lapse of predetermined time ($\Delta T$), a subtraction value ($\Delta N$) is subtracted from the target rotational speed ($N_i$) (step S3).

Then, the target rotational speed ($N_i$) and preset minimum target rotational speed ($N_{min}$) are compared to each other (step S4). When the target rotational speed ($N_i$) is larger than the minimum target rotational speed ($N_{min}$), the detected engine speed and the target rotational speed ($N_i$) are compared to each other (step S6). When the engine speed is larger than the target rotational speed ($N_i$), ignition to the engine is cut off (or fuel injection is stopped, as well as ignition being cut off) (step S7). Meanwhile, when the detected engine speed is smaller than the target rotational speed ($N_i$), the ignition is performed normally.

The step S2 through the step S7 (step S6) are repeated, and the subtraction value ($\Delta N$) is subtracted from the target rotational speed ($N_i$) in the step S3. When the target rotational speed ($N_i$) is decreased to the minimum target rotational speed ($N_{min}$) (step S4), the target rotational speed ($N_i$) is set to a certain value of the minimum target rotational speed ($N_{min}$) and kept at it thereafter (step S5).

As the ignition is controlled by determining whether or not the ignition should be cut off based on the preset target rotational speed ($N_i$) in the step S6, the engine speed after the occurrence of the failure can be decreased according to the target rotational speed ($N_i$). When the engine speed is decreased to the minimum target rotational speed ($N_{min}$) in the step S5, the engine speed is kept at the minimum target rotational speed ($N_{min}$) thereafter.

While the invention is explained above by way of preferable embodiments, such descriptions are not limiting items. Therefore, various modifications may be made. For example, in the foregoing embodiment, the engine control device is implemented by the ignition control. However, the engine control device may be implemented by controlling the throttle valve to be rotatively actuated in the closing direction, along with the ignition.

The term "two-wheeled motor vehicle" used herein means a motorcycle, including every motorbike and motor scooter, and, more particularly, is a vehicle which can be turned by tilting the vehicle body. Thus, a vehicle equipped with two or more front wheels and/or two or more rear wheels, thus having three or four (or more) wheels in total is also included in the "two-wheeled motor vehicle." Without any limitation to motorcycles, the present invention may also be applied to other vehicles, as long as a vehicle can take advantage of effects of the invention. This includes any straddle type vehicles, such as four-wheeled buggies or all terrain vehicles (ATV) and snowmobiles.

The present invention provides the excellent advantages as described above. However, the practical application of the invention to straddle type vehicles should involve consideration of the embodiments from an overall viewpoint including other requirements.

The present invention can provide an engine control device capable of decreasing engine output while giving less uncomfortable feeling to the rider in the event of a failure, with a simple configuration.

The invention claimed is:

1. An engine control device for a straddle type vehicle, having engine output decreasing means for decreasing engine output when a failure has been detected in a throttle valve control system, the engine output decreasing means comprising:

target rotational speed setting means for setting an engine speed, after the occurrence of the failure, to a target rotational speed required to decrease engine output, wherein the target rotational speed is set to decrease stepwise by a change of rotational speed ($\Delta N$) at a change of regular time intervals ($\Delta T$) based on the engine speed at a time of the occurrence of the failure, wherein the values of the change of rotational speed ($\Delta N$) and the change of time intervals ($\Delta T$) are gradually increased with a lapse of time; and rotational speed detection means for detecting the engine speed after the occurrence of the failure, wherein when the engine speed detected by the rotational speed detection means is larger than the target rotational speed, an ignition of the engine is cut off.

2. The engine control device for a straddle type vehicle according to claim 1, wherein the target rotational speed has preset minimum target rotational speed, which is a lower limit value of the target rotational speed range.

3. The engine control device for a straddle type vehicle according to claim 2, wherein the minimum target rotational speed is set at least to a value larger than the engine speed at idle.

4. The engine control device for a straddle type vehicle according to claim 1, wherein when the engine speed detected by the rotational speed detection means is larger than the target rotational speed, fuel injection to the engine is stopped.

5. The engine control device for a straddle type vehicle according to claim 1, wherein a throttle valve is designed to be rotatively actuated in the closing direction when the failure has been detected in the throttle valve control system.

6. An engine control method for a straddle type vehicle, having engine output decreasing means for decreasing engine output when a failure is detected in a throttle valve control system, wherein
the engine output decreasing means has an output decreasing mode in which engine output is decreased when a failure has been detected in a throttle valve control system,
a target rotational speed is set to decrease stepwise by a change of rotational speed ($\Delta N$) at a change of time intervals ($\Delta T$) based on engine speed at a time of occurrence of the failure, wherein the values of the change of rotational speed ($\Delta N$) and the change of time intervals ($\Delta T$) are gradually increased with a lapse of time, and
in the output decreasing mode, when engine speed after the occurrence of the failure is larger than preset target rotational speed at the time of the occurrence of the failure, an ignition of the engine is cut off.

7. The engine control method for a straddle type vehicle according to claim 6, wherein in the output decreasing mode, when the engine speed after the occurrence of the failure is larger than the preset target rotational speed at the time of the occurrence of the failure, fuel injection to the engine is stopped.

8. A straddle type vehicle with the engine control device according to claim 1.

9. A straddle type vehicle implementing the engine control method of claim 6.

10. The engine control device for a straddle type vehicle according to claim 1, wherein the target rotational speed has preset minimum target rotational speed, which is a lower limit value of the target rotational speed range.

* * * * *